US006835273B1

(12) United States Patent
Vargas

(10) Patent No.: US 6,835,273 B1
(45) Date of Patent: Dec. 28, 2004

(54) CLAMP FOR MAINTAINING A FLEXIBLE TUBING AND METHOD FOR SEALING SAME WITH A WELD SEAM

(75) Inventor: Didier Vargas, Villeneuve (FR)

(73) Assignee: Compagnie Generale des Matieres Nucleaires, Velizy-Villacoublay (FR)

(*) Notice: Subject to any disclaimer, the term of this patent is extended or adjusted under 35 U.S.C. 154(b) by 316 days.

(21) Appl. No.: 10/031,078

(22) PCT Filed: Jul. 12, 2000

(86) PCT No.: PCT/FR00/02015

§ 371 (c)(1),
(2), (4) Date: Jan. 14, 2002

(87) PCT Pub. No.: WO01/05557

PCT Pub. Date: Jan. 25, 2001

(30) Foreign Application Priority Data

Jul. 15, 1999 (FR) ........................................... 99 09167

(51) Int. Cl.$^{7}$ ............................................... B32B 31/20

(52) U.S. Cl. .................... 156/308.4; 156/290; 156/579; 53/477

(58) Field of Search ............................. 156/270, 308.2, 156/308.4, 579, 581; 53/477, 373.7, 374.2, 374.8, 375.6; 269/1, 2, 6, 160, 161, 254 R, 254 CS, 87.2, 87.3; 81/424, 426.5, 427, 487, 302

(56) References Cited

U.S. PATENT DOCUMENTS

| | | | | | |
|---|---|---|---|---|---|
| 632,444 | A | * | 9/1899 | Chaussinand | 425/318 |
| 2,644,142 | A | * | 6/1953 | Danberg | 439/224 |
| 2,815,777 | A | * | 12/1957 | Iraids | 81/424 |
| 3,322,603 | A | | 5/1967 | Grasso | |
| 3,398,746 | A | * | 8/1968 | Abramson | 606/147 |
| 4,335,712 | A | | 6/1982 | Trexler | |
| 4,461,193 | A | * | 7/1984 | Gruber et al. | 81/420 |
| 5,074,870 | A | | 12/1991 | von Zeppelin | |
| 5,142,776 | A | | 9/1992 | Neely | |

FOREIGN PATENT DOCUMENTS

| | | | | |
|---|---|---|---|---|
| GB | 1062051 | A | * | 3/1967 |
| SE | 525 801 | | | 1/1971 |

* cited by examiner

*Primary Examiner*—Blaine Copenheaver
*Assistant Examiner*—John L. Goff
(74) *Attorney, Agent, or Firm*—Pearne & Gordon LLP

(57) ABSTRACT

Heating tongs (6) are used to cut a sleeve (4) fixed around an opening (1) of a chamber (2) after the objects to be taken out of the chamber have been introduced. Another pair of tongs (9) is placed on the side of the opening (1) to tighten the sleeve (4) and to keep it flat to avoid pleats, to allow ventilation during the preparation and to avoid tension in the sleeve; the latter would compromise the sealing taking place.

1 Claim, 2 Drawing Sheets

CLAMP FOR MAINTAINING A FLEXIBLE TUBING AND METHOD FOR SEALING SAME WITH A WELD SEAM

The present invention relates to closing supple sleeves by sealing in order to enclose and to isolate certain objects, together with holding tongs for the sleeve, which facilitate the process. The domain of the invention is more precisely that of leak-proof chambers under controlled pressure lower than atmospheric pressure such as glove boxes, from where it is sometimes necessary to extract parcels, taken out through openings around which flexible vinyl sleeves have been set in place. Afterwards, heating tongs are brought close to a position near the sleeve between the objects and the link with the opening to the chamber, in order to carry out three seals in this place before selecting one. The objects can then be taken away without polluting externally, and in the same way the portion of the sleeve remaining fixed to the chamber comprises no opening which could compromise its seal.

Despite its simplicity, this process is fastidious in practice. The low pressure chamber tends, in general, to cause pleats in the sleeves, to suck them in and to deform them continually.

If the sleeve is sealed when a pleat has been formed, the work risks being incorrect and the seal incomplete along its length. If there is tension on the sleeve during sealing, there is a possible risk of confinement rupture at this point, which is unacceptable. Therefore one has to take care while working, and a second operator is used in practice just to support the parcel and to hold the sleeve while his or her colleague is engaged in sealing.

The present invention proposes an improvement of this process, and the original means used for carrying it out comprise supplementary tongs, whose function is not to seal but to prevent the formation of pleats by holding the sleeve flat over its whole width, to allow continuous aspiration between the parcel and the chamber during the preparation and to avoid tension in the sleeve during sealing by setting the holding tongs against the link with the opening because of the low pressure in the chamber.

These tongs comprise two articulated branches provided with facing edges able to be set apart to a distance close to the thickness of the sleeve when they are set parallel in a closure position of the branches; in addition, indentations are grooved in one of the facing edges.

The tongs are set in place before the operation of sealing the sleeve, by setting them on a portion of the sleeve at the level of the opening of the chamber.

Below, the invention will be described in more detail in order to emphasize its elements and advantages, together with its operation. With reference to the following figures.

Figure 1:
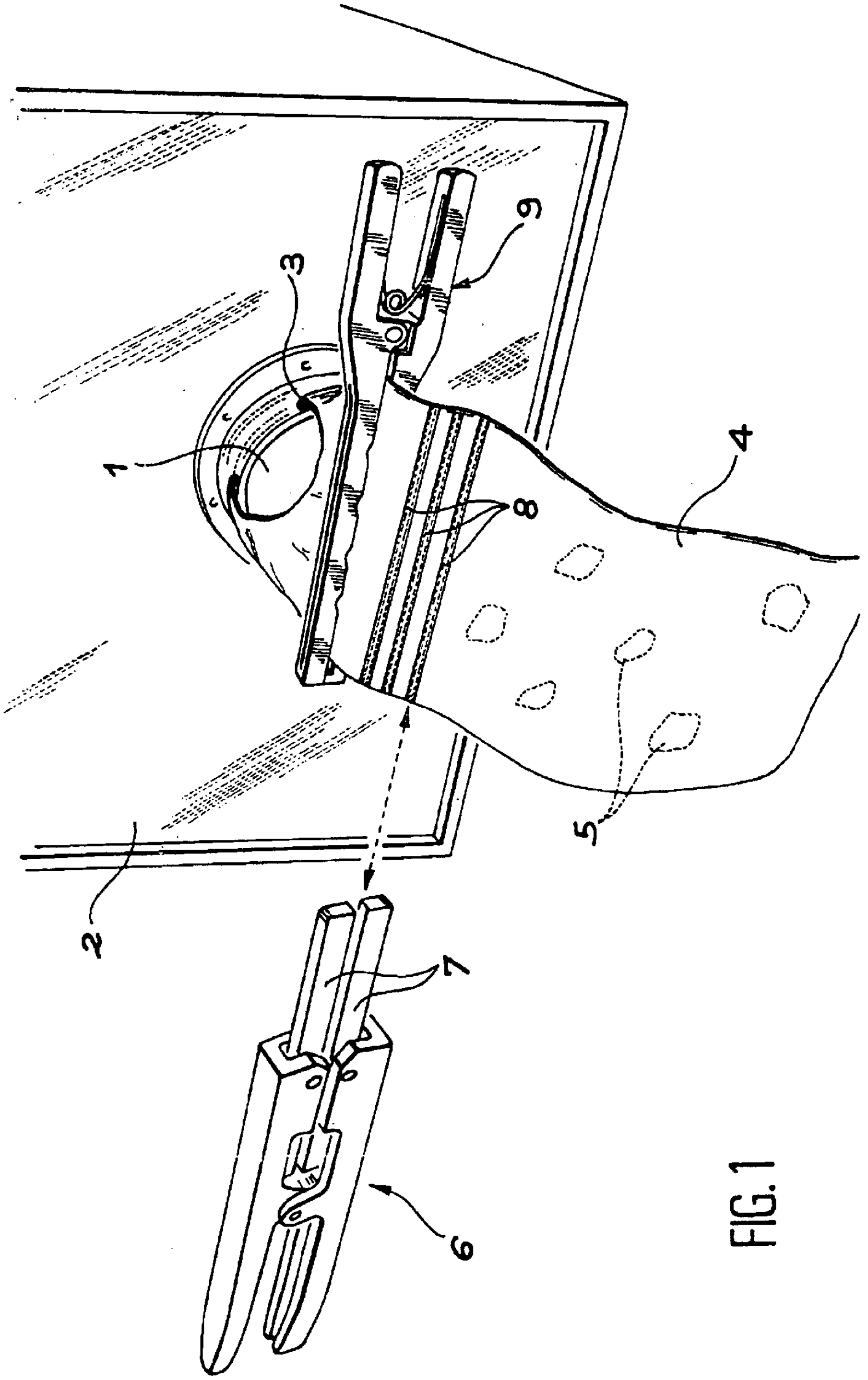
FIG. 1 is a view of the assembly of the elements of the process.
Figure 2:
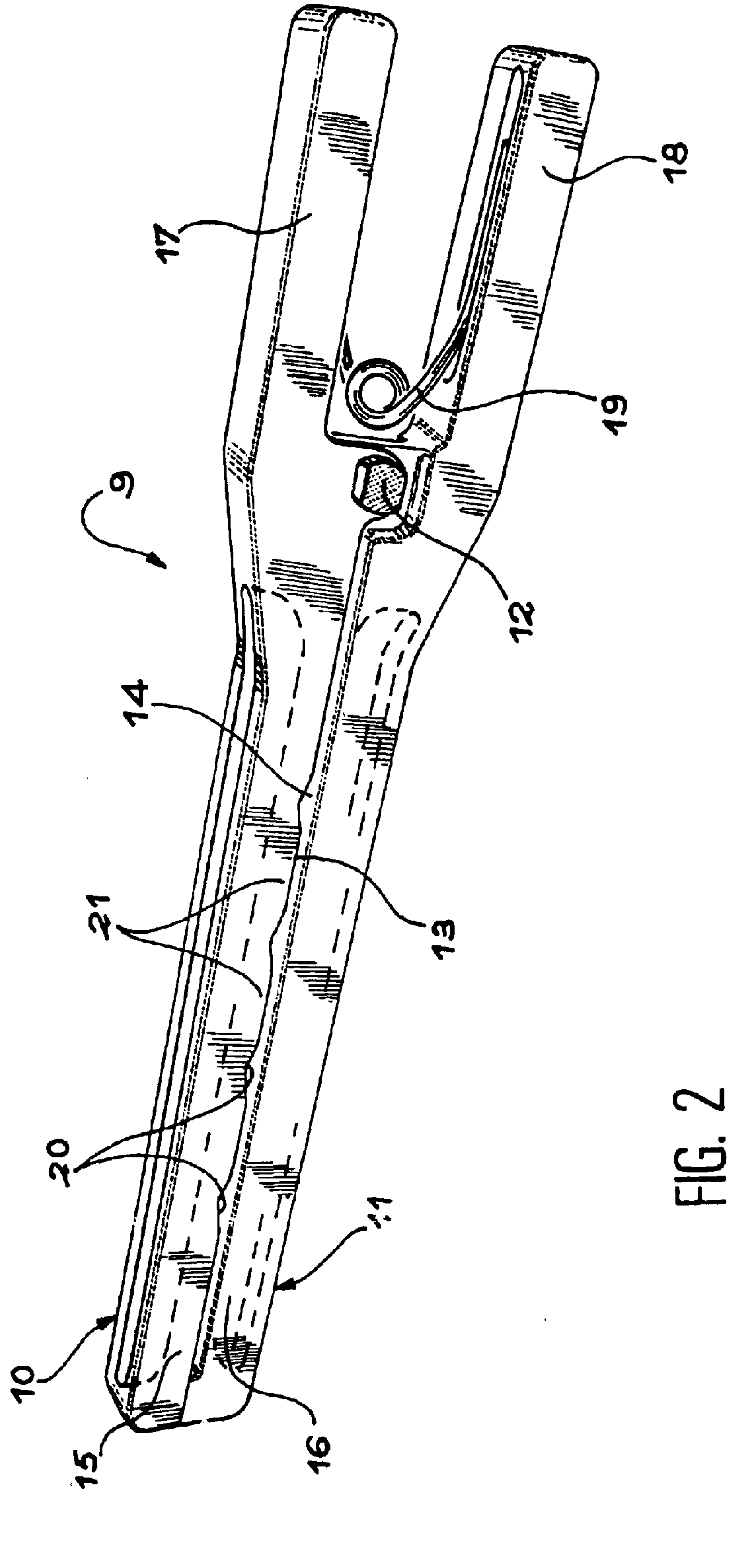
FIG. 2 illustrates the new tongs.

On an opening 1 of a chamber 2 represented schematically, the extremity 3 of a flexible sleeve 4 in vinyl is under tension so as to form a sealed link 3. The chamber 2 is under low pressure, as is normal for such techniques where it generally contains polluting or dangerous materials, in order to avoid any accidental leak from the chamber atmosphere 2 towards the exterior. The sleeve 4 is intended to contain certain parcels or objects 5, which need to be extracted from the chamber 2. When they are introduced into it, heating tongs 6 are brought in, provided with two clamping jaws 7, to the regions 8 in order to seal the sleeve 4. These regions 8 are clamped between the jaws 7, and then an electric current is passed through a resistance adjacent to one of the jaws 7 in order to heat it, melt the vinyl, and seal the sleeve 4 by sealing the regions 8, after which the sleeve 4 can be cut in the middle of the regions 8 in order to detach the objects 5 without exposing them to the open air and without compromising the seal of the chamber 2. Nonetheless, beforehand, another pair of tongs 9 has been set on the sleeve 4 between the regions 8 and the link 3; these clamping or holding tongs 9 comprise, as seen more clearly in FIG. 2, a pair of branches 10 and 11 articulated together by a pivot 12 and which comprise the facing clamping edges, 13 and 14 respectively, which remain apart even when the clamp 9 is closed to its maximum; their distance is almost equal to the thickness of the sleeve 4, so as to be able to grip it evenly and firmly but without using excessive effort which could lead to the formation of pleats. A stop between the branches 10 and 11 is provided by a contact between the end portions 15 and 16. Branches 10 and 11 are terminated by handles 17 and 18, beyond the pivot 12, which makes it possible to open the tongs 9 when they are gripped. A spring 19 is compressed between the handles 17 and 18 and keeps them apart to maintain the branches 10 and 11 close to the side of the facing surfaces 13 and 14 when the tongs 9 are released.

Nonetheless, one of these branches 10 is supplied with indentations 20 whose function is to allow slight gaping of the lips of the flattened sleeve 4 so that aspiration towards the chamber 2 can continue when the tongs 9 have been installed. The indentations 20 are arranged in such a way as to interrupt the edge 13 of the branch 10 on which they are installed, so much so that firm contact only really exists at the location of the holding jaws 21 which alternate with the indentations 20 on the branch 10.

Clamping with the tongs 9 prevents formation of pleats in the regions to be sealed 8; in such a way that the heating tongs 6 can be used by bringing them up to the holding tongs, in order to avoid any tension between them. In addition, the tongs 9, longer than the diameter of the opening 1, remain crosswise and are held in place by the low pressure of the chamber 2, which also immobilises sufficiently the sleeve 4.

What is claimed is:

1. Sealing process of a flexible sleeve fixed on an opening (1) of a low pressure chamber (2) by applying heated tongs (6), characterized in that the process comprises a preparatory installation stage for a pair of holding tongs on a portion of the sleeve near the opening (1) of the low pressure chamber and above the sealing region (8) of the sleeve, wherein the holding tongs comprise two articulated branches (10, 11), the branches comprising facing edges (13, 14) separated by a distance corresponding almost to the same thickness as the sleeve when they are held parallel in a closed position of the branches and indentations (20) on one of the facing edges.

* * * * *